United States Patent
Matheny et al.

(10) Patent No.: US 11,707,811 B2
(45) Date of Patent: Jul. 25, 2023

(54) TOOL STORAGE POD SYSTEM

(71) Applicant: Parker-Hannifin Corporation, Cleveland, OH (US)

(72) Inventors: Ryan K. Matheny, Vandalia, OH (US); Jesse W. Marconett, West Alexandria, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 262 days.

(21) Appl. No.: 17/079,730

(22) Filed: Oct. 26, 2020

(65) Prior Publication Data

US 2021/0245315 A1 Aug. 12, 2021

Related U.S. Application Data

(60) Provisional application No. 62/972,118, filed on Feb. 10, 2020.

(51) Int. Cl.
*B23Q 3/157* (2006.01)
*B23Q 3/155* (2006.01)

(52) U.S. Cl.
CPC ........... *B23Q 3/15536* (2016.11); *B23Q 2003/15532* (2016.11)

(58) Field of Classification Search
CPC .. Y10T 483/1864; Y10T 483/18–1891; B23Q 2003/15532; B23Q 3/15536; B23Q 3/15526–3/15539; B23Q 3/1572–3/15724; B23Q 13/00; B25H 3/003; B25H 3/04
USPC ....... 483/58–68; 211/70.6, 69; 206/372, 379
See application file for complete search history.

(56) References Cited

U.S. PATENT DOCUMENTS

| | | | |
|---|---|---|---|
| 3,604,565 A | 9/1971 | Freeman et al. | |
| 4,253,830 A * | 3/1981 | Kazen | A61C 3/04 211/69 |
| 4,770,297 A * | 9/1988 | Chang | B65D 85/28 206/379 |

(Continued)

FOREIGN PATENT DOCUMENTS

| | | |
|---|---|---|
| DE | 102008007217 | 8/2009 |
| JP | 2002-361536 | 12/2002 |

(Continued)

OTHER PUBLICATIONS

Machine Translation of JP 2012-051087 A, which JP '087 was published Mar. 2012.*

(Continued)

*Primary Examiner* — Erica E Cadugan
(74) *Attorney, Agent, or Firm* — McDonnell Boehnen Hulbert & Berghoff LLP

(57) ABSTRACT

An example pod for tool storage comprises: an elongated body; a cavity formed within the elongated body, wherein the cavity has a geometric shape that matches a shape of a tool body of a tool to be stored in the pod; an opening in the elongated body, wherein the opening has a respective geometric shape that matches a shape of a cutting end of the tool; at least one male feature formed on an exterior surface of the elongated body to facilitate coupling the pod to another pod; and at least one female feature formed on the exterior surface of the elongated body facilitate coupling the pod to another pod.

6 Claims, 5 Drawing Sheets

(56) References Cited

U.S. PATENT DOCUMENTS

| | | | |
|---|---|---|---|
| 4,811,843 A | 3/1989 | Stribiak | |
| 5,672,145 A * | 9/1997 | Pollington | B23Q 3/15722 |
| | | | 483/59 |
| 6,047,827 A * | 4/2000 | Huang | B25H 3/003 |
| | | | 206/349 |
| 7,802,680 B2 * | 9/2010 | Krebs | B25H 3/04 |
| | | | 211/70.6 |

FOREIGN PATENT DOCUMENTS

| | | | |
|---|---|---|---|
| JP | 2012-051087 A * | 3/2012 | |
| JP | 2016-010822 A * | 1/2016 | |
| JP | 2019-038060 | 3/2019 | |

OTHER PUBLICATIONS

Machine Translation of JP 2016-010822 A, which JP '822 was published Jan. 2016.*

* cited by examiner

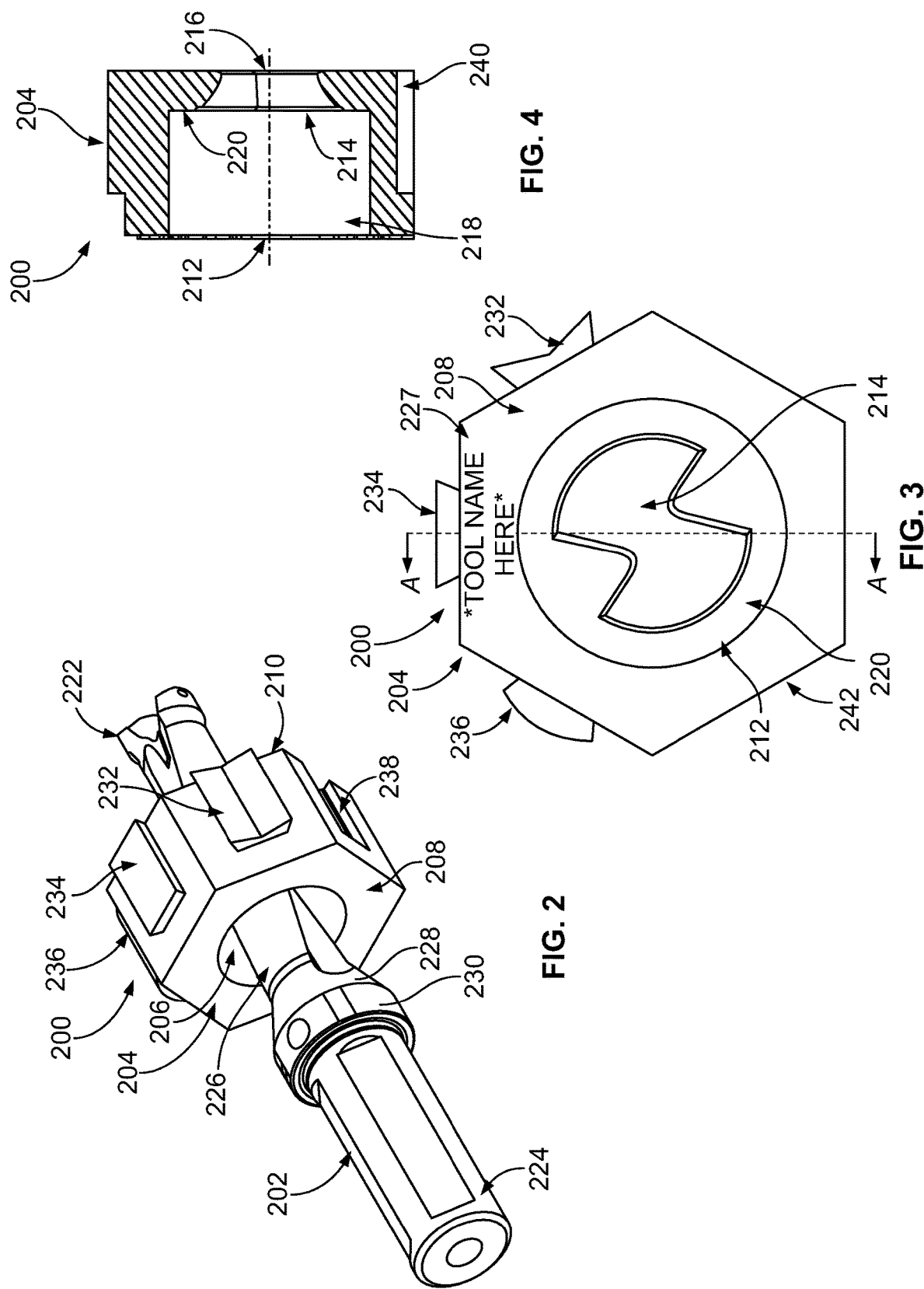

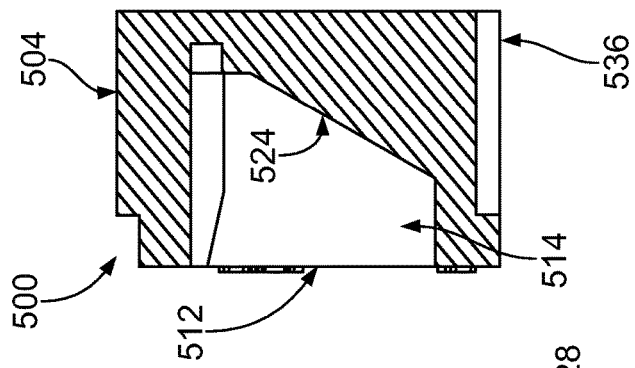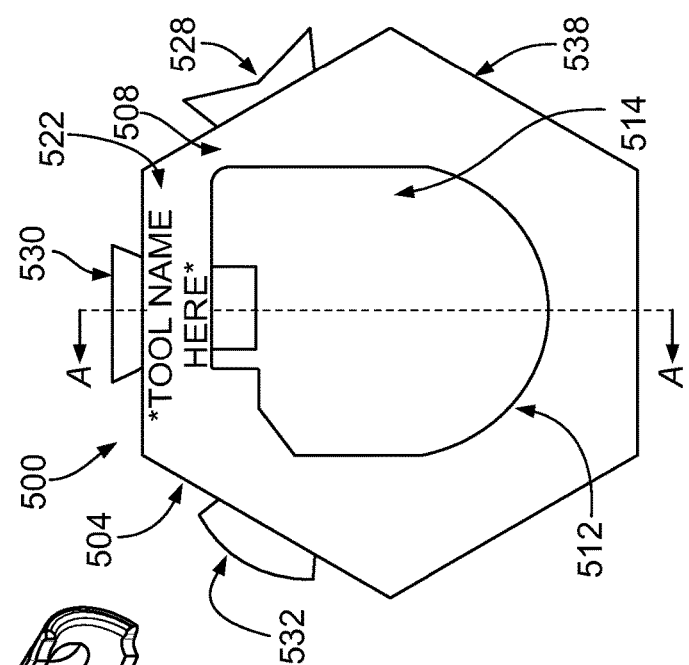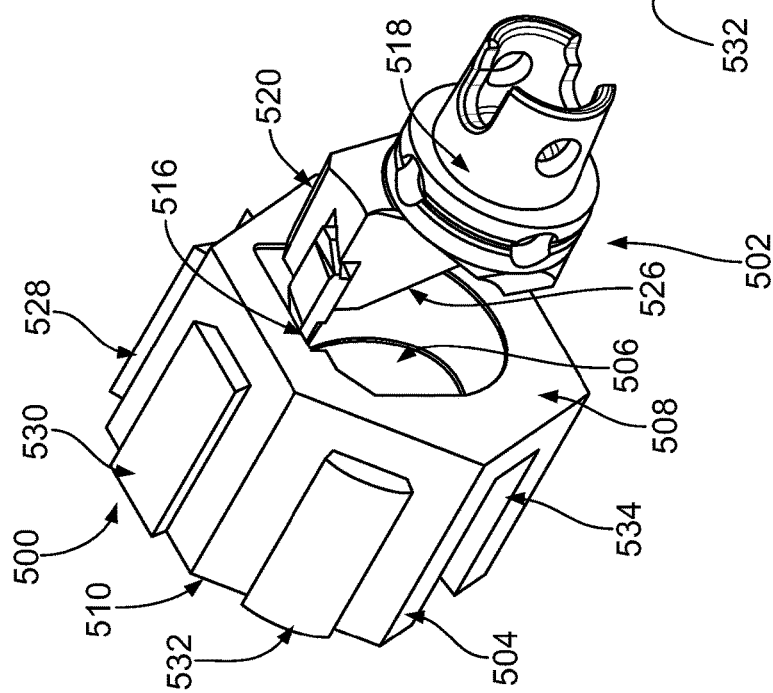

TOOL STORAGE POD SYSTEM

CROSS REFERENCE TO RELATED APPLICATION

The present application claims priority to U.S. Provisional patent application No. 62/972,118 filed on Feb. 10, 2020, and entitled "Tool Storage Pod System," the entire contents of which are herein incorporated by reference as if fully set forth in this description.

BACKGROUND

In manufacturing facilities and workshops, operators typically have tool storage or tool holder devices that can hold several tools next to a point of use where the operator is expected to use the tools. In conventional tool storage systems, tools are held in a tool storage device with their cutting edges pointing upward and being exposed. This configuration can cause operators to be injured when they approach the tool storage device and attempt to pull a tool to use it.

Further, a typical tool storage device can have several holes that receive any type of tool, regardless of the shape of the cutting end of the tools. As tools can be placed in any location, audit and replenishment of tools can be more challenging as they can easily be misplaced.

It is with respect to these and other considerations that the disclosure made herein is presented.

SUMMARY

The present disclosure describes implementations that relate to a tool storage pod system.

In a first example implementation, the present disclosure describes a pod for tool storage, The pod includes: (i) an elongated body; (ii) a cavity formed within the elongated body, wherein the cavity has a geometric shape that matches a shape of a tool body of a tool to be stored in the pod; (iii) an opening in the elongated body, wherein the opening has a respective geometric shape that matches a shape of a cutting end of the tool; (iv) at least one male feature formed on an exterior surface of the elongated body to facilitate coupling the pod to another pod; and (v) at least one female feature formed on the exterior surface of the elongated body facilitate coupling the pod to another pod.

In a second example implementation, the present disclosure describes a tool storage system. The tool storage system includes: a plurality of pods configured to store respective tools, each pod of the plurality of pods comprising: (i) an elongated body, (ii) a cavity formed within the elongated body, wherein the cavity has a geometric shape that matches a shape of a tool body of a respective tool to be stored in the pod, (iii) an opening in the elongated body, wherein the opening has a respective geometric shape that matches a shape of a cutting end of the respective tool, (iv) at least one male feature formed on an exterior surface of the elongated body to facilitate coupling the pod to another pod of the plurality of pods, and (v) at least one female feature formed on the exterior surface of the elongated body facilitate coupling the pod to another pod of the plurality of pods.

In a third example implementation, the present disclosure describes a tool storage system configured as a rail system. The tool storage system includes: a first rail support plate; a second rail support plate offset from, and parallel to, the first rail support plate to form a space between the first rail support plate and the second rail support plate; and a plurality of pods configured to store respective tools, wherein the plurality of pods are disposed in the space between, and are coupled to, the first rail support plate and the second rail support plate. Each pod of the plurality of pods includes: (i) an elongated body that is generally cylindrical, (ii) a cavity formed within the elongated body, wherein the cavity has a geometric shape that matches a shape of a tool body of a respective tool to be stored in the pod, (iii) an opening in the elongated body, wherein the opening has a respective geometric shape that matches a shape of a cutting end of the respective tool, (iv) a plurality of legs emanating from the elongated body and coupling the elongated body to the first rail support plate and the second rail support plate.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 2 illustrates a perspective view of a pod for storing a tool, in accordance with an example implementation.

FIG. 3 illustrates a top view of the pod shown in FIG. 2, in accordance with an example implementation.

FIG. 4 illustrates a cross-sectional view A-A of the pod shown in FIG. 2 as labelled in FIG. 3, in accordance with an example implementation.

FIG. 5 illustrates a perspective view of a pod for storing a tool, in accordance with an example implementation.

FIG. 6 illustrates a top view of the pod shown in FIG. 5, in accordance with an example implementation.

FIG. 7 illustrates and a cross-sectional view A-A of the pod shown in FIG. 5 as labelled in FIG. 6, in accordance with an example implementation.

DETAILED DESCRIPTION

Within examples, disclosed herein are systems and apparatuses associated with tool storage pod systems. An example pod is configured to be tool-specific and can hold a specific tool, as opposed to being a generic tool holder capable of holding any type of tool. The pod is also configured such that the cutting end, which has the sharp cutting edges of the tool, is inserted into the pod, whereas the shank of the tool (i.e., the tool end opposite the cutting end) projects outward from the pod and is exposed. This way, an operator can grab the shank of the tool to pull the tool out of the tool storage system, thereby avoiding being lacerated or injured by the sharp edges of the cutting end of the tool.

Each pod can have a cavity having a shape that matches the profile or shape of the tool. Each pod can also have a hole or opening with a particular cross-section or shape that is specific to and matches a particular cross section of the cutting end of a tool. This configuration can render the storage system mistake-proof. Particularly, only a specific type of tool or class of tools can be received in a corresponding pod, and the pod cannot receive other types of tools that do not match the shapes of the cavity and the opening of the pod.

The pods can further include features on their exterior peripheral surfaces that allow a pod to engage with another pod in a modular configuration. With this configuration, the tool storage pod system can have any desirable number of pods corresponding to a number of tools to be stored. Tool pods can be added for new tools to be stored, and obsolete or damaged pods can be removed and replaced.

Figure 1:
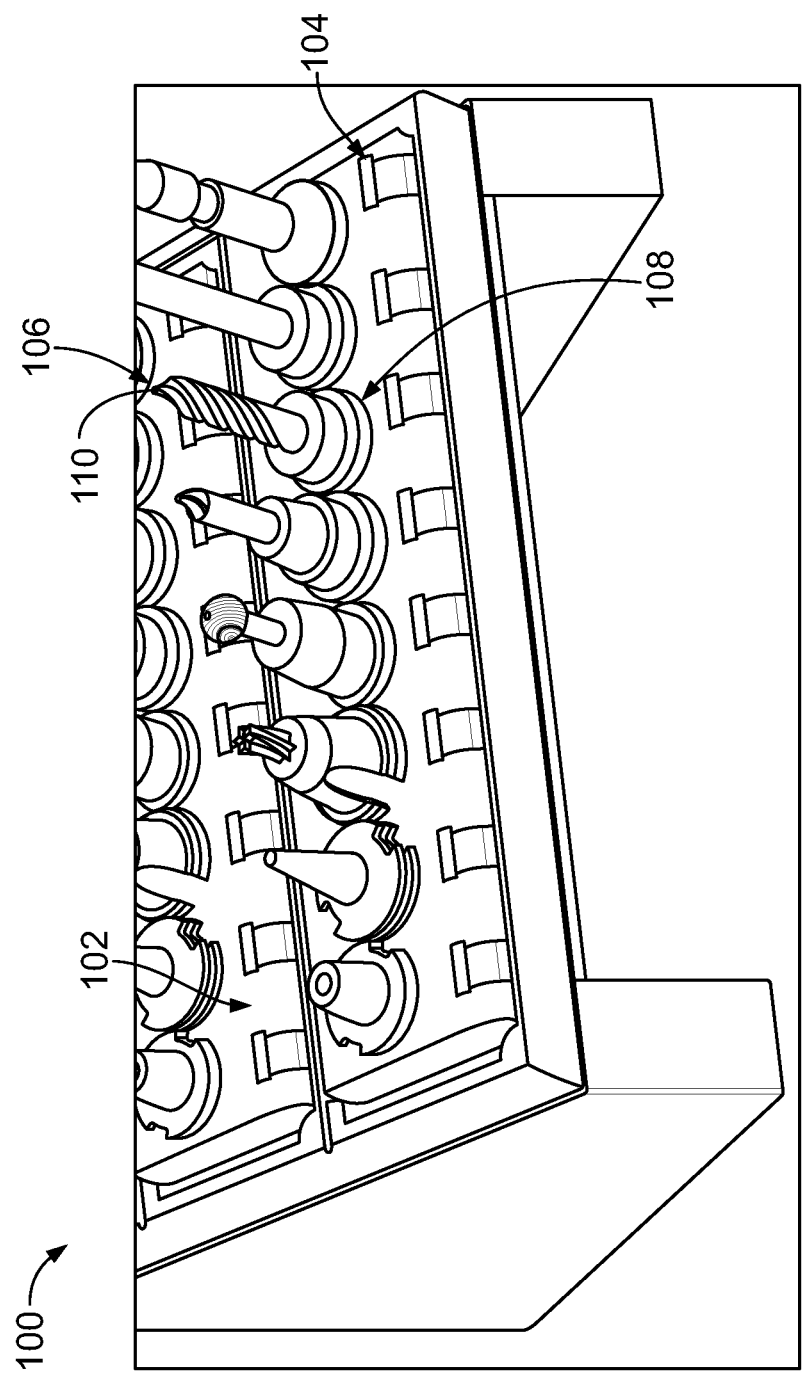
FIG. 1 illustrates a tool storage system, according to the prior art.

FIG. 1 illustrates a tool storage system 100, according to the prior art. The tool storage system 100 can have two strips 102, 104 having holes therein configured to receive tools such as tool 106 for storage.

As depicted in FIG. 1, the holes in the strips 102, 104 receive the shanks of the tools, such as shank 108 of the tool 106, whereas the cutting ends (sharp edges), such as cutting end 110 of the tool 106, are exposed and pointing outward from the tool storage system 100. An operator reaching out to the tool 106 is exposed to the cutting end 110 and can thus be injured while attempting to handle the tool 106. This configuration can thus pose a safety hazard to operators.

Further, the holes in the strips 102, 104 can all have the same size and can receive any type of tool regardless of the type of tool or the configuration of the cutting edge of the tool. As such, any tool can be placed anywhere in the strips 102, 104. In other words, the geometry of the tools such as the tool 106 is not taken into consideration and the storage place of the tool 106 is not dedicated or specific to the tool 106. Rather, the tool storage system 100 provides a common or generic configuration for the holes that can hold any type of tool.

Additionally, the tools might not be personalized to an operator and might not be labeled, rendering performing tool audits and tool replenishment challenging. It may thus be desirable to have a tool storage system that is configured to protect operators from being lacerated by the sharp edges of the tools. It may also be desirable to have a tool storage system that is modular and can have different number of tool pods connected together as desired such that the number of tools being stored can be changed as desired. It may also be desirable to have a tool storage system that is mistake-proof where a tool can be inserted or stored at a specific location dedicated to such tool, rather than any location in the tool storage system. This way, tools can be labelled and personalized as desired.

FIG. 2 illustrates a perspective view of a pod 200 for storing a tool 202, FIG. 3 illustrates a top view of the pod 200, and FIG. 4 illustrates a cross-sectional view A-A of the pod 200 as labelled in FIG. 3, in accordance with an example implementation. The term "pod" is used herein to indicate a shell, hull, or case comprising an elongated body that forms a detachable and self-contained unit configured to receive a specific tool.

The pod 200 has an elongated body 204 that is hollow and has a through-hole 206 formed therethrough. The elongated body 204 has a top end face 208 and a bottom end face 210. The through-hole 206 extends from the top end face 208 to the bottom end face 210. The through-hole 206 can comprise an upper or top opening 212 formed at the top end face 208, an inner opening 214, and a lower or bottom opening 216 formed at the bottom end face 210.

The through-hole 206 can thus form a cavity 218 within the pod 200 between the top opening 212 and the inner opening 214. The openings 212, 214, and 216 can have different shapes, geometries, or profiles, and thus a profile, geometry, or shape of the cavity 218 changes laterally and longitudinally as it extends from the top end face 208 to the bottom end face 210 to match a shape formed by the exterior surface of the tool 202. The geometry or shape of a cavity may enable a snap-fit, tight fit, etc. with a tool (e.g., a tool body, or a tool cutting end, etc.); for instance, the cavity can be formed by a mold of an exterior of the tool for duplicating exterior geometric sizing, or configuration, etc.

In the implementation shown in FIGS. 2-4, the inner opening 214 is smaller than the top opening 212. Therefore, the pod 200 comprises a shoulder 220 formed at the transition from the larger diameter of the top opening 212 to the inner opening 214.

The tool 202 can have (i) a cutting end 222 having sharp cutting edges, (ii) a shank 224 (i.e., an end opposite of the cutting end 222) for handling the tool 202, and (iii) a tool body 226. To store the tool 202, the tool 202 can be inserted through the top opening 212 in the pod 200 such that the cutting end 222 is inserted first and is thus disposed inward, away from an operator, whereas the shank 224 faces the operator. This way, the operator can pull the tool 202 from the shank 224 without being exposed to the sharp edges of the cutting end 222.

Further, a shape or geometry of the inner opening 214 matches a shape or geometry of the cutting end 222 (e.g., shape or geometry of the cross-section of the cutting end 222) such that the inner opening 214 accommodates the cutting end 222 therethrough as the tool 202 is inserted in the pod 200. The term "shape of an opening" is used herein to indicate the shape or geometry of the opening's interior or the shape that is outlined by edges that bound the opening. The term "shape of a cavity" is used herein to indicate the shape or geometry of a cavity's interior or the shape that is outlined by interior surface of a pod body that bounds the cavity.

Because the inner opening 214 has a shape that matches the shape of the cutting end 222, the inner opening 214 would not allow a different tool with a cutting end having a different shape to pass therethrough. In other words, the pod 200 is tool-specific and can be used to store or accommodate only the tool 202 (or a class of similar tools) having the cutting end 222 with the depicted shape. This way, the configuration of the pod 200 renders the tool storage system mistake-proof and not prone to human error as the pod 200 does not allow a tool other than the tool 202 to be received through the pod 200.

Further, the pod 200 can be labelled with the name of the specific tool, i.e., the tool 202, which matches the pod 200. For example, the pod 200 can have a label 227 disposed on the top end face 208 having the name of the tool 202. The label 227 can facilitate quick identification of the tool 202 when the operator desires to use it.

The tool body 226 has a tapered section 228 that leads to an enlarged-diameter section 230 of the tool 202. The cavity 218 has a shape or geometry that matches such geometry of the tool body 226. Once the tool 202 is fully inserted in the pod 200, the enlarged-diameter section 230 of the tool 202 is accommodated within the cavity 218 to render the tool 202 stable within the pod 200. As mentioned above, the tool 202 is positioned such that the shank 224 is facing upward while the cutting end 222 is facing downward, and thus gravity ensures that the tool 202 remains within the pod 200 as the enlarged-diameter section 230 is accommodated within the cavity 218. In other words, the tool 202 is placed in a stable position that precludes the tool 202 from falling off.

A through-hole such as the through-hole 206 can be used when the corresponding tool, i.e., the tool 202 in this example, is a long tool to help the tool remain stable while stored in the pod 200. In other examples, the tool can be short, and in such examples, a blind hole or blind cavity can be used as described below with respect to FIGS. 5-7.

Further, the shape of the inner opening 214 illustrated in FIGS. 2-4 and corresponding shape of the cutting end 222 of the tool 202 are examples for illustration. The tool storage system can have several pods, each having a particular configuration and shape of its inner opening to match a corresponding tool. FIGS. 5-7 depict another example pod and tool combination for illustration.

FIG. 5 illustrates a perspective view of a pod 500 for storing a tool 502, FIG. 6 illustrates a top view of the pod 500, and FIG. 7 illustrates a cross-sectional view A-A of the pod 500 as labelled in FIG. 6, in accordance with an example implementation. The pod 500 has an elongated body 504 that has a blind hole 506 formed therein. The elongated body 504 has a top end face 508 and a bottom end face 510. The blind hole 506 extends from the top end face 508 through inner space of the pod 500, but does not reach the bottom end face 510. The blind hole 506 comprises an opening 512 formed at the top end face 508 of the pod 500.

The blind hole 506 can form a cavity 514 within the pod 500. The cavity 514 is bound by an interior surface of the pod 500, and the interior surface or the shape of the cavity 514 laterally and longitudinally matches a corresponding shape and geometry of the tool 502. Particularly, the interior surface of the pod 500 that bounds or defines the cavity 514 matches a profile formed by an exterior surface of the tool 502.

The tool 502 can have (i) a cutting end 516 having sharp cutting edges, (ii) a tool connection 518 (i.e., an end opposite of the cutting end 516) for handling the tool 502 and connecting the tool 502 to a machine (e.g., lathe), and (iii) a tool body 520. To store the tool 502, the tool 502 can be inserted through the opening 512 in the pod 500 such that the cutting end 516 is inserted first and is thus disposed inward, away from an operator, whereas the tool connection 518 faces the operator. This way, the operator can pull or handle the tool 502 without being exposed to the sharp edges of the cutting end 516.

Further, a shape or geometry of the opening 512 matches a shape of the cutting end 222 such that the opening 512 accommodates the cutting end 516 therethrough as the tool 502 is inserted in the pod 500. As mentioned above, the "shape of an opening" is used herein to indicate the shape that is outlined by edges that bound the opening. As such, the opening 512 is configured as a cut-out that matches a shape of the cutting end 516 (e.g., a shape of a cross-section of the cutting end 516) of the tool 502.

Because the opening 512 has a shape that matches the shape or profile of the cutting end 516, the opening 512 would not allow a different tool with a cutting end having a different shape to pass therethrough. In other words, the pod 500 is tool-specific and can be used to store or accommodate only the tool 502 (or a class of similar tools) having the cutting end 516 with the depicted shape. This way, the configuration of the pod 500 renders the tool storage system mistake-proof and not prone to human error as the pod 500 does not allow a tool other than the tool 502 to be received through the pod 500.

Further, the pod 500 can be labelled with the name of the specific tool, i.e., the tool 502, which matches the pod 500. For example, the pod 500 can have a label 522 disposed on the top end face 508 having the name of the tool 502. This can facilitate quick identification of the tool 502 when the operator desires to use it.

As mentioned above, the shape of the cavity 514 within the pod 500 laterally and longitudinally matches a profile or shape of the tool 502. For example, the interior surface of the elongated body 504 that bounds the cavity 514 can have a tapered surface 524 that matches or is configured to interface with a corresponding tapered surface 526 of the tool 502. Once the tool 502 is fully inserted in the pod 500, the tapered surface 524 interfaces with the corresponding tapered surface 526. As mentioned above, the tool 502 is positioned such that the tool connection 518 is facing upward while the cutting end 516 is facing downward. This way, gravity ensures that the tool 502 remains within the pod 500, and that the tapered surface 524 maintains contact with the corresponding tapered surface 526.

The pods 200, 500 are examples of pods that can be used to store and handle tools in a safe manner. To form a tool storage system that is capable of storing several tools, it may be desirable to configured the pods (e.g., the pods 200, 500) in a manner that facilitate connecting them to each other to form an assembly or system of pods that can receive a corresponding number of tools. It may further be desirable to be able to add more pods for more tools or remove pods and tools as needed.

In examples, the pods, such as the pods 200, 500, can be configured such that the elongated bodies 204, 504 are multi-sided or multi-edged (i.e., non-circular). In other words, the elongated bodies 204, 504 can be formed as polygons. In the example implementations of FIGS. 2-7, the elongated bodies 204, 504 are each configured as a hexagon having six sides; however, in other examples, the elongated bodies 204, 504 can each be configured as a pentagon, heptagon, octagon, etc. Such a multi-side configuration allows the pods 200, 500 to have features formed on their exterior surfaces to facilitate connecting them to other pods in a particular configuration.

Referring back to FIGS. 2-4, the pod 200 can have male features (e.g., protrusions) and female features (e.g., grooves) formed on respective sides, and on an exterior surface of, the elongated body 204. For instance, the pod 200 can have three male features: a first male feature 232, a second male feature 234, and a third male feature 236, each formed on a respective side of the elongated body 204 on the exterior surface or periphery thereof. The pod 200 can further have can have three female features configured as grooves such as first female feature 238, second female feature 240, and third female feature 242, each formed on a respective side of the other three sides of the elongated body 204 that do not have male features.

With this configuration, the pod 200 can be secured to other surrounding pods by way of male and female features being engaged with corresponding features of the surrounding pods. For instance, one of the male features 232-236 can be aligned with a respective female feature or groove of another pod, then the pod 200 can be slid longitudinally to insert the male feature into the groove of the other pod, and secure the two pods to each other.

Notably, in examples, the shapes of the male features 232-236 can be different in geometry from each other. For instance, the male feature 232 has a V-shaped profile or exterior surface, the male feature 234 has a flat exterior surface, and the male feature 236 has a curved exterior surface. The shapes of the female features 238-242 can also be different from each other and match respective shapes of the male features 232-236. As such, two pods can be engaged with each other in a particular desired configuration that is mistake-proof to form a tool storage system with a particular layout.

Referring back to FIGS. 5-7, the pod 500 can similarly have male features (e.g., protrusions) and female features (e.g., grooves) on an exterior surface of the elongated body 504 thereof. For instance, the pod 500 can have a first male feature 528, a second male feature 530, and a third male feature 532, each formed on a respective side of the elongated body 504 on the exterior surface or periphery thereof. The pod 500 can further have female features configured as grooves such as first female feature 534, second female feature 536, and third female feature 538, each formed on a respective side of the other three sides of the elongated body 504 that do not have male features.

With this configuration, the pod 500 can engage with corresponding features of another pod to secure the pods to each other. For instance, one of the male features 528-532 can be aligned with a respective female feature or groove of another pod, then the pod 500 can be slid longitudinally to insert the male feature into the groove of the other pod, and secure the two pods to each other.

In examples, the geometric shapes of the male features 528-532 can be different from each other, and the shapes of the female features 534-538 can also be different from each other and match respective shapes of the male features 528-532. As such, two pods can be engaged with each other in a particular desired configuration that is mistake-proof to form a tool storage system with a particular layout.

Figure 10:
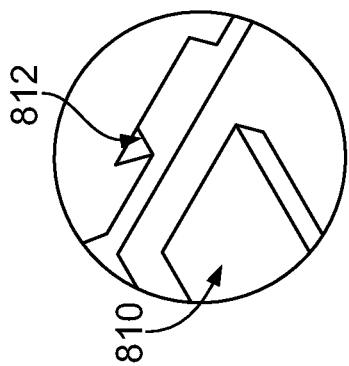
FIG. 10 illustrates detail "B" labelled in FIG. 8, in accordance with an example implementation.
Figure 9:
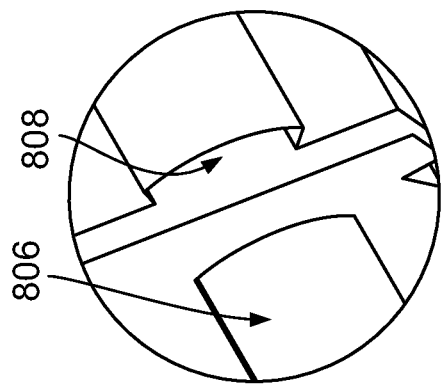
FIG. 9 illustrates detail "A" labelled in FIG. 8, in accordance with an example implementation.
Figure 8:
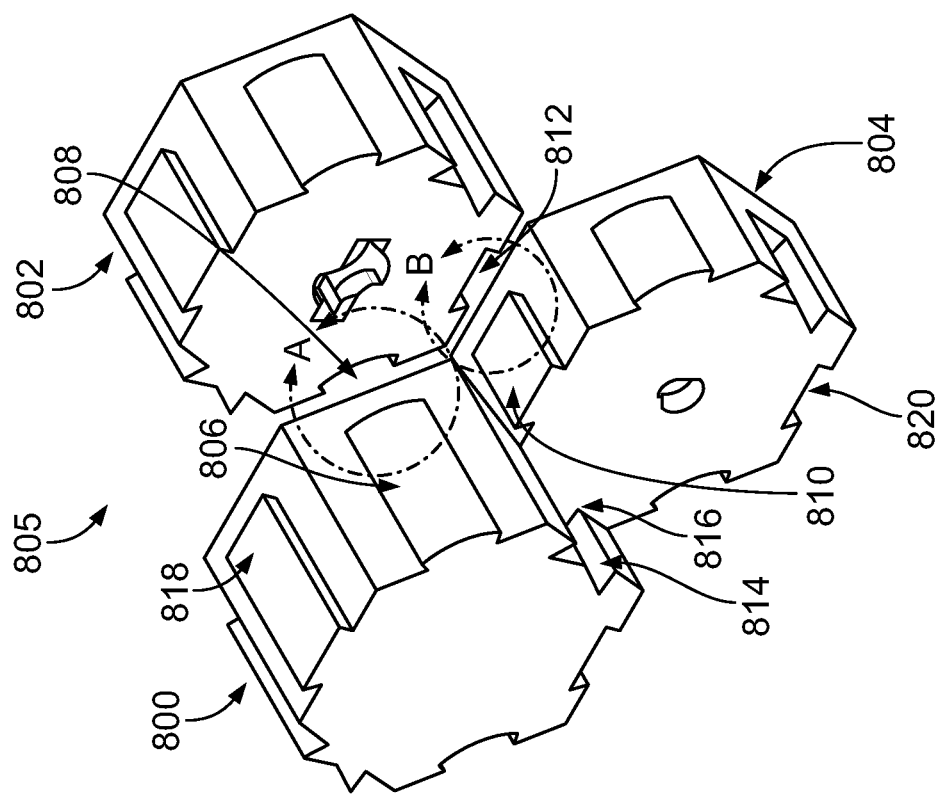
FIG. 8 illustrates connecting three pods to each other to form a tool storage system, in accordance with an example implementation.

FIG. 8 illustrates connecting three pods 800, 802, and 804 to each other to form a tool storage system 805, FIG. 9 illustrates detail "A" labelled in FIG. 8, and FIG. 10 illustrates detail "B" labelled in FIG. 8, in accordance with an example implementation. The pods 800, 802, and 804 can be configured similar to the pods 200, 500 described above, with each pod being configured to receive a specific tool having a shape that matches a shape of respective cavities and openings within the pods 800, 802, 804.

The pods 800, 802, 804 have male and female features similar to those of the pods 200, 500. For example, as illustrated by detail "A" in FIG. 9, the pod 800 can have a male feature 806 that has a curved surface. The pod 802 can have a corresponding female feature 808 that has a shape longitudinally-matching the geometry and curvature of the male feature 806. As such, that pods 800, 802 can be connected or coupled to each other by aligning the male feature 806 to the female feature 808 and sliding one or both of the pods 800, 802 relative to teach other.

Similarly, as illustrated by detail "B" in FIG. 10, the pod 804 can have a male feature 810 and the pod 802 can have a corresponding female feature 812. As such, that pods 802, 804 can be connected or coupled to each other by aligning the male feature 810 to the female feature 812 and sliding one or both of the pods 802, 804 relative to teach other.

At the same time, the pods 800, 804 can also be connected to each other. The pod 800 can have a female feature 814 that matches a male feature 816 of the pod 804 to facilitate coupling the pods 800, 804 to each other. In the configuration depicted in FIG. 8, the pods 800-804 are coupled to each other in a manner that the resulting assembly of pods is similar to a honeycomb structure facilitated by the multi-sided configuration of the pods 800-804. More pods can be added to the assembly of pods shown in FIG. 8 as desired by coupling male and female features of the added pods to female and male features of the pods 800-804.

If space is not available for such an extended honeycomb structure, the pods can be assembled in a vertical or horizontal structure (e.g., a strip). For instance, rather than coupling the male feature 806 to the female feature 808 to couple the pod 800 to the pod 802, a male feature 818 of the pod 800 can instead be coupled to female feature 820 of the pod 804 to couple the pod 800 to the pod 804. The resulting structure is a vertical structure or strip of pods coupled to each other.

Further, as mentioned above, the geometric shapes of the male features can be different from each other, and the corresponding female features can also have different geometric shapes that respectively match the geometries of the corresponding male features. This way, the pods can be coupled to each other in a specific manner to generate one or more particular outlets.

For instance, while the male feature 806 of the pod 800 can be coupled to the female feature 808 of the pod 802, it does not match or fit the female feature 812. Similarly, the male feature 818 of the pod 800 can be coupled to the female feature 812 or the female feature 820, but does not match or fit other female features of the pods. As such, the pod 800 can be coupled to the pod 802 in particular desired orientations.

In another example tool storage system, pods for holding the tools can be placed in a rail system. Pods can be mounted to the rail system in a modular configuration where pods can be added or removed as desired.

Figure 12:
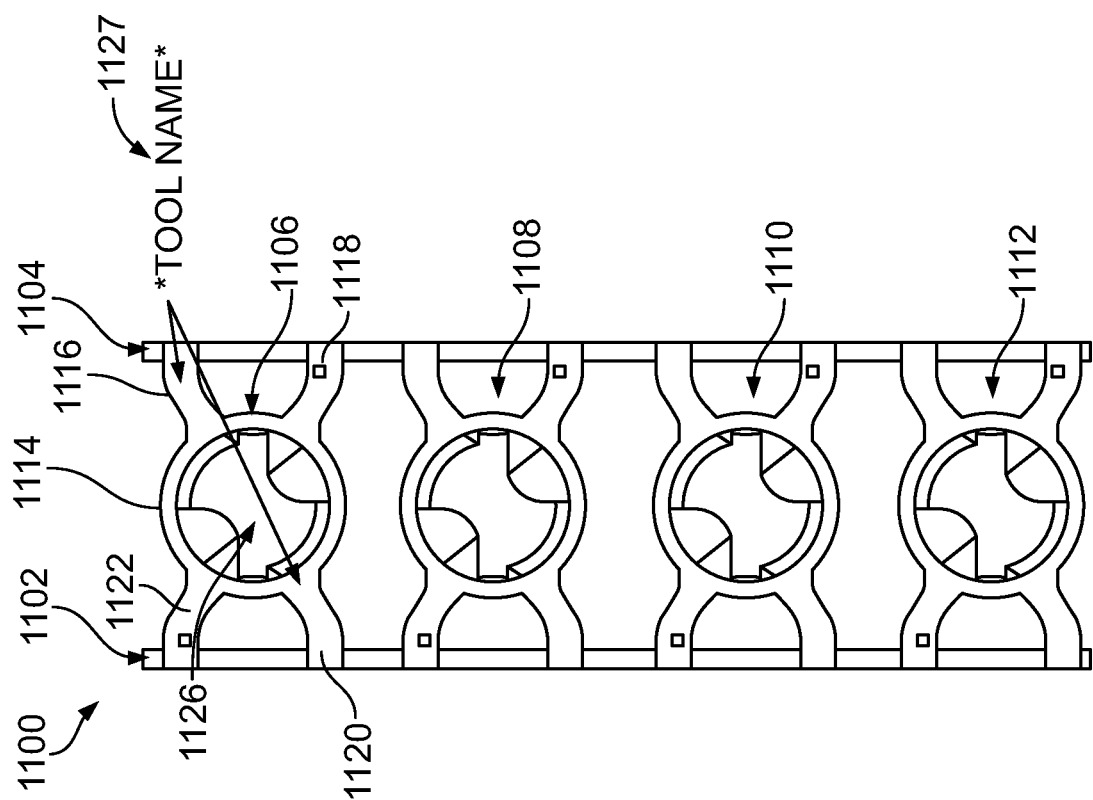
FIG. 12 illustrates a front view of the tool storage system shown in FIG. 11, in accordance with an example implementation.
Figure 11:
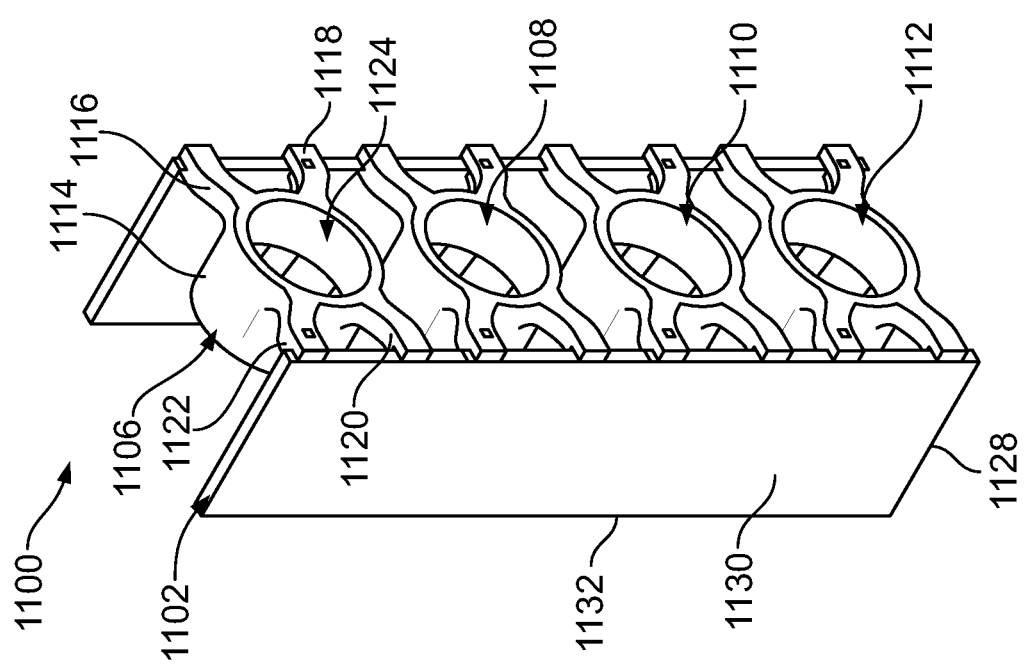
FIG. 11 illustrates a perspective view of a tool storage system configured as a rail system, in accordance with an example implementation.

FIG. 11 illustrates a perspective view of a tool storage system 1100 configured as a rail system, and FIG. 12 illustrates a front view of the tool storage system 1100, in accordance with an example implementation. In the example implementation shown in FIGS. 11-12, the tool storage system 1100 can have a first rail support plate 1102 and a second rail support plate 1104.

The rail support plates 1102, 1104 are configured as rail bars that are laterally-offset from, and parallel to, each other to form a space therebetween. Pods for holding tools, such as pods 1106, 1108, 1110, and 1112 can then be mounted to the rail support plates 1102, 1104 in the space therebetween.

In an example, the pods 1106-1112 can be configured as quadruped structures that can be mounted to the rail support plates 1102, 1104. For instance, the pod 1106 can have a main body portion 1114 that is generally cylindrical. The pod 1106 can further include four legs 1116, 1118, 1120, and 1122 that can be integral with or coupled to the main body portion 1114. In other words, the legs 1116-1122 can emanate radially from the main body portion 1114.

The main body portion 1114 can be configured similar to the pods 200, 500 described above in that it can have a cavity 1124 with a profile or shape that changes longitudinally and laterally to match a respective shape of a tool to be stored in the pod 1106. The main body portion 1114 can also have an opening 1126 therein (see FIG. 12), the shape of which being configured to match a cross-sectional shape of a cutting end of the tool to be stored therein.

The legs 1116-1122 facilitate mounting the pod 1106 to the rail support plates 1102, 1104. For instance, the rail support plate 1102 can have respective grooves that operate as female features configured to respectively receive the legs 1116-1122 of the pod 1106 to mount or couple the pod 1106 to the rail support plates 1102, 1104. In an example, the legs 1116-1122 can be friction fitted within the grooves to fixedly position or secure the pod 1106 to the rail support plates 1102, 1104.

In another example, the rail support plates 1102, 1104 can have screw holes. The legs 1116-1122 can have corresponding screw holes that can be respectively aligned with the screw holes of the rail support plates 1102, 1104. Fasteners can then be inserted into the aligned screw holes to couple and secure the pod 1106 to the rail support plates 1102, 1104.

The pods 1108, 1110, and 1112 can be configured similar to the pod 1106 and can be mounted in a similar manner to the rail support plates 1102, 1104. Although the pods 1106-1112 are depicted as quadrupeds, they can have other configurations. For instance, they can each have at least two legs (e.g., two or three legs), rather than four, that can be mounted to the rail support plates 1102, 1104.

The pods 1106-1112 can be labelled with respective tool names to facilitate placing the matching tools to the pods 1106-1112. For instance, tool name labels 1127 can be placed on one or more of the legs 1116-1122.

The tool storage system 1100 can be disposed in an upright position as shown in FIGS. 11-12 where the pods 1106-1112 are disposed vertically between the rail support plates 1102, 1104. For example, this upright position can be achieved when bottom surfaces of the rail support plates 1102, 1104, such as bottom surface 1128 of the rail support plate 1102, are placed on a flat surface. Alternatively, the tool storage system 1100 can be disposed in a horizontal position when side surfaces (e.g., side surface 1130 of the rail support plate 1102) or back surfaces (e.g., back surface 1132 of the rail support plate 1102) are placed on a flat surface.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A tool storage system comprising:
   a plurality of pods configured to store respective tools, each pod of the plurality of pods comprising:
      an elongated body configured as a polygon,
      a cavity formed within the elongated body, wherein the cavity has a geometric shape that matches a shape of a tool body of a respective tool to be stored in the pod,
      an opening in the elongated body, wherein the opening has a respective geometric shape that matches a shape of a cutting end of the respective tool,
      a plurality of male features formed on respective sides of the polygon to facilitate coupling the pod to another pod of the plurality of pods, and
      a plurality of female features formed on other sides of the polygon not having male features to facilitate coupling the pod to another pod of the plurality of pods, wherein the plurality of male features are each different in geometry from each other, and wherein the plurality of female features are each different in geometry from each other.

2. The tool storage system of claim 1, wherein the pods of the plurality of pods are coupled to each other by way of male features of the plurality of male features on sides of a pod being engaged with respective female features of the plurality of female features of respective sides of surrounding pods, such that the plurality of pods form a honeycomb structure.

3. The tool storage system of claim 1, wherein, for each pod of the plurality of pods, the elongated body has a top end face and a bottom end face, wherein each pod of the plurality of pods is oriented such that the corresponding cutting end of the respective tool is inserted first through the corresponding top end face such that the corresponding cutting end is not exposed.

4. The tool storage system of claim 3, wherein, for each pod of the plurality of pods, the opening is formed in the top end face.

5. The tool storage system of claim 3, wherein, for each pod of the plurality of pods, the corresponding opening is formed within the corresponding elongated body between the corresponding top end face and the corresponding bottom end face.

6. The tool storage system of claim 1, wherein each pod of the plurality of pods further comprises:
    a label indicating a name of the respective tool having the tool body matching the geometric shape of the cavity and the cutting end matching the geometric shape of the opening.

\* \* \* \* \*